US012800984B2

(12) United States Patent
Shimizu et al.

(10) Patent No.: US 12,800,984 B2
(45) Date of Patent: Nov. 17, 2026

(54) TRANSMISSION SYSTEM, APPARATUS, TRANSMISSION METHOD AND PROGRAM

(71) Applicant: NTT, Inc., Tokyo (JP)

(72) Inventors: Shimpei Shimizu, Musashino (JP); Takayuki Kobayashi, Musashino (JP); Yutaka Miyamoto, Musashino (JP)

(73) Assignee: NTT, Inc., Tokyo (JP)

( * ) Notice: Subject to any disclaimer, the term of this patent is extended or adjusted under 35 U.S.C. 154(b) by 329 days.

(21) Appl. No.: 18/580,660

(22) PCT Filed: Aug. 13, 2021

(86) PCT No.: PCT/JP2021/029816
§ 371 (c)(1),
(2) Date: Jan. 19, 2024

(87) PCT Pub. No.: WO2023/017616
PCT Pub. Date: Feb. 16, 2023

(65) Prior Publication Data
US 2025/0085608 A1 Mar. 13, 2025

(51) Int. Cl.

| | |
|---|---|
| ***G02F 1/39*** | (2006.01) |
| ***G02F 1/35*** | (2006.01) |
| ***H04B 10/291*** | (2013.01) |

(52) U.S. Cl.
CPC ............ *G02F 1/392* (2021.01); *G02F 1/3534* (2013.01); *H04B 10/291* (2013.01)

(58) Field of Classification Search
CPC ...... G02F 1/3534; G02F 1/392; H04B 10/291
See application file for complete search history.

(56) References Cited

U.S. PATENT DOCUMENTS 9,065,243 B2 * 6/2015 Asobe .................. G02F 1/3532
9,246,624 B1 1/2016 Yang et al.
(Continued)

FOREIGN PATENT DOCUMENTS

JP 2015-161827 A 9/2015
JP 2016-059040 A 4/2016
(Continued)

OTHER PUBLICATIONS

Y. Okamura et al., "Frequency Nondegenerate Optical Parametric Phase-sensitive Amplifier Repeater by Using Recovered Pump Carrier Generated from Phase-conjugated Twin Waves," in Opt. Fiber Comm. Conf., OSA Technical Digest (Optica Publishing), 3 pages, https://doi.org/10.1364/ofc.2016.th2a.7. (Year: 2016).*
(Continued)

*Primary Examiner* — Daniel Petkovsek

(57) ABSTRACT

A transmission system is presented for transmitting an optical signal which includes a phase conjugate light generation part which generates phase conjugate light of the optical signal and an optical phase-sensitive amplifying part which phase-sensitively amplifies the optical signal and the phase conjugate light, where the optical signal has a frequency in a first band, and the phase conjugate light has a frequency in a second band that differs from the first band. The first band is a frequency band in which the sensitivity of light reception of a receiver which receives the optical signal is a predetermined level or more among the frequency bands in which a transmitter which outputs the optical signal is able to output the optical signal with a predetermined intensity or more and the second band is a higher or lower frequency band than the first band.

6 Claims, 12 Drawing Sheets

(56) References Cited

U.S. PATENT DOCUMENTS

| | | | | |
|---|---|---|---|---|
| 10,673,530 | B2 * | 6/2020 | LeGrange | H04B 10/118 |
| 11,387,909 | B2 * | 7/2022 | Kazama | G02F 1/39 |
| 2018/0366900 | A1 * | 12/2018 | Akasaka | H04B 10/291 |
| 2021/0044358 | A1 | 2/2021 | Kazama et al. | |

FOREIGN PATENT DOCUMENTS

| | | | |
|---|---|---|---|
| JP | 2018-019350 | A | 2/2018 |
| JP | 2019-161476 | A | 9/2019 |

OTHER PUBLICATIONS

T. Kobayashi et al., “Wide-band Inline-Amplified WDM Transmission Using PPLN-Based Optical Parametric Amplifier”, IEEE J. Lightwave Technol., vol. 39, No. 3, pp. 787-794, Feb. 2021.

R. Malik et al., “Demonstration of Ultra Wideband Phase-Sensitive Fiber Optical Parametric Amplifier”, Photon. Technol. Lett., vol. 28, No. 2, pp. 175-177, 2015.

T. Umeki et al., “First demonstration of high-order QAM signal amplification in PPLN-based phase sensitive amplifier”, Optics Express, 2014, vol. 22, No. 3, pp. 2473-2482.

* cited by examiner

TRANSMISSION SYSTEM, APPARATUS, TRANSMISSION METHOD AND PROGRAM

CROSS-REFERENCE TO RELATED APPLICATIONS

This application is a 371 U.S. National Phase of International Application No. PCT/JP2021/029816, filed on Aug. 13, 2021. The entire disclosure of the above application is incorporated herein by reference.

TECHNICAL FIELD

The present invention relates to a transmission system, an apparatus, a transmission method, and a program.

BACKGROUND ART

In recent years, the importance of optical communication techniques has increased more and more due to factors such as the increase in opportunities to work from home due to the impact of COVID-19 and the rise of e-sports. Although optical communication is attracting attention in this way, optical communication generally uses wavelength division multiplexing (WDM) which utilizes an amplification band of an erbium-doped fiber amplifier (EDFA) as a transmission band. The amplification band of an EDFA is specifically a band of approximately 4 THz within the C-band or L-band wavelength band.

An EDFA is an optical amplifier configured to amplify an optical signal which has been attenuated by transmission as it is and is used for relaying signals and improving reception sensitivity. An optical amplifier whose action does not depend on the phase of the signal such as an EDFA is called a phase-in-sensitive amplifier (PIA). A PIA is very useful for optical communication because it can amplify an attenuated optical signal as it is. However, PIAs also have problems.

Specifically, the problem of a PIA is that amplified spontaneous emission (ASE) noise which is noise derived from ASE is mixed in and thus deterioration of a signal-to-noise (SN) ratio which is always 3 dB or more occurs for coherent input light. That is to say, a PIA has a problem that the signal-to-noise ratio (optical signal-to-noise ratio: SNR) deteriorates due to the ASE noise.

In fact, among various noise factors in optical fiber transmission, this is one of the essential factors which limit a transmission capacity and a transmission distance.

There are other intrinsic factors which limit a transmission capacity and a transmission distance in optical fiber transmission. This is a non-linear phenomenon caused due to an increased energy density in optical fibers. In order to ensure a high SNR, it is necessary to increase the transmission power of the optical signal relatively against noise. However, when the energy density in the optical fiber increases, waveform distortion due to the non-linear optical effect becomes apparent, resulting in deterioration of characteristics.

Under these circumstances, reduction of ASE noise and compensation for non-linear distortion in optical amplifiers are important for further lengthening and increasing the capacity of optical fiber transmission and several techniques have been studied to solve these problems.

A phase-sensitive amplifier (PSA) using optical parametric amplification (OPA) is being studied as a means of overcoming the noise limit of the PIA in the related art. OPA is one of non-linear optical processes in which signal light is amplified by inputting signal light and high-power excitation light into a medium with high optical non-linearity.

Non-linear optical media include media which utilize second-order non-linearity and media which utilize third-order non-linearity and representative examples thereof include lithium niobate and dispersion-shifted optical fibers. As a secondary effect accompanying signal amplification by the OPA, there is an effect that idler light which is phase conjugate light of the signal light is generated. OPA can cause various optical phenomena by using this idler light.

PSA is one of the devices which uses OPA. In PSA, the generated phase conjugate light and the original input signal Light are superimposed within the same band. As a result, the PSA prevents the ASE of the orthogonal components. Since the ASE of the orthogonal component is prevented, the noise produced by the PSA is a noise limit or less of the PIA. That is to say, the PSA is a low noise amplification device. PSA also has the effect of compensating for distortion in the phase direction due to non-linear optical effects and the like.)

One type of PSA is a device called a degenerate PSA occurring when a channel to be amplified is placed at a degenerate frequency which is a center of the amplification band of the PSA. In degenerate PSA, idler light is generated within the same band as the signal light by the interaction between the signal light and excitation light in the non-linear optical medium. As a result, in the degenerate PSA, the idler light is superimposed on the signal light, resulting in a phase sensitive width effect. However, amplification using degenerate PSA has a problem that it is necessary to perform parallel amplification using a plurality of devices when amplifying a WDM signal and a problem that it cannot amplify a signal such as a quadrature amplitude modulation (QAM) signal which has signal points on both the real axis and the imaginary axis on the complex plane.

Thus, in order to amplify WDM signals and high-order QAM signals, research is being conducted on non-degenerate PSA (ND-PSA) in which signals are arranged at frequencies shifted from the degenerate frequency in PSA (refer to for example PTL 1). ND-PSA uses signal light and idler light whose frequencies are symmetrical about the degenerate frequency. Such signal light and idler light are generated in advance on the transmitting side. In ND-PSA, signal light and idler light co-propagate in a transmission line. Furthermore, a phase sensitive amplification operation occurs due to the interaction among the three light waves having different frequencies such as signal light, idler light, and excitation light in the non-linear optical medium. This is ND-PSA.

When the frequency relationship between the signal light and the idler light is symmetrical about the degenerate frequency, the phase conjugate converted light of the idler light is generated exactly within the same band as the signal light. The same applies to the phase conjugate converted light of the signal light. Phase-sensitive amplification of the WDM signal by ND-PSA is realized by generating and propagating idler light for the wavelength-multiplexed signal light.

In the band of signal light in ND-PSA, phase conjugate conversion light of input idler light (that is, light having the same complex amplitude distribution as the original signal light) is superimposed. For this reason, in ND-PSA, information in the phase direction is retained even after amplification. Therefore, ND-PSA allows amplification of QAM signals.

The idler light generated in advance on the transmission side is generally optically generated using OPA which receives only the signal light after modulating the signal light as in normal optical transmission. Such a device in which OPA is used for generating idler light which is phase conjugate light of signal light is called an optical phase conjugate converter (OPC).

Note that, since the ND-PSA does not need to receive this idler light for data demodulation, a transmitter/receiver for idler light is not essential.

CITATION LIST

Patent Literature

[PTL 1] Japanese Patent Application Publication No. 2015-161827

Non Patent Literature

[NPL 1] T. KOBAYASHI et al., "Wide-band Inline-amplified WDM Transmission Using PPLN-based Optical Parametric Amplifier with the optical bandwidth over 10 THz," IEEE J. Lightwave Technol., vol. 39, No. 3, pp. 787 to 794, February 2021.

[NPL 2] R. Malik, et al., "Demonstration of Ultra Wideband Phase-Sensitive Fiber Optical Parametric Amplifier," Photon. Technol. Lett., vol. 28, No. 2, pp. 175 to 177, December 2015.

SUMMARY OF INVENTION

Technical Problem

As described above, the application of PSA to large-capacity information communication using WDM and high-order QAM signals requires a non-degenerate configuration. Note that the non-degenerate configuration means using signal light and idler Light whose frequencies are symmetrical with respect to the degenerate frequency.

In the related art, OPA has been developed and proven as an amplification method for amplifying C-band signal light, and most of them have the center of the amplification band near the center of the C-band. For this reason, the PSA has also been proven to have low noise properties with respect to signal light within the C-band. However, in the configuration in the related art, it is necessary to divide the band of the existing C-band transmission system into two for signal light and idler light.

For this reason, even if the SNB of the signal is improved using the PSA, the number of WDM channels is halved compared to the existing transmission system in which the entire C-band is used as signal light. As a result, even if the SNR of the signal is improved using the PSA, the total transmission capacity per system in the optical fiber transmission does not necessarily increase and sometimes decreases.

In view of the above circumstances, an object of the present invention is to provide a technique for increasing the transmission capacity of a transmission system for transmitting optical signals.

Solution to Problem

An aspect of the present invention is a transmission system for transmitting an optical signal which includes a phase conjugate light generation part which generates phase conjugate light of the optical signal whose frequency is within a first band in a second band different from the first band and an optical phase-sensitive amplifying part which phase-sensitively amplifies the optical signal and the phase conjugate light and in which the first band is a frequency band in which the sensitivity of light reception of a receiver which receives the optical signal is a predetermined level or more among the frequency bands in which a transmitter which outputs the optical signal is able to output the optical signal with a predetermined intensity or more and the second band is a higher or lower frequency band than the first band.

An aspect of the present invention is a transmission method performed by a transmission system which includes a phase conjugate light generation part which generates phase conjugate light of an optical signal whose frequency is within a first band in a second band different from the first band and an optical phase-sensitive amplifying part which phase-sensitively amplifies the optical signal and the phase conjugate light and in which the first band is a frequency band in which the sensitivity of light reception of a receiver which receives the optical signal is a predetermined level or more among the frequency bands in which a transmitter which outputs the optical signal is able to output the optical signal with a predetermined intensity or more and the second band is a higher or lower frequency band than the first band, including: an optical signal generating step of generating the optical signal.

An aspect of the present invention is a program for causing a computer to function as the above transmission system.

Advantageous Effects of Invention

The present invention makes it possible to increase a transmission capacity of a transmission system which transmits optical signals.

DESCRIPTION OF EMBODIMENTS

Embodiments

For the sake of simplicity of the explanation, an optical fiber transmission system will be described with an example in which a frequency band of an optical signal is a C-band and idler light is generated on a high frequency side. However, the frequency band of the optical signal does not necessarily have to be a C-band. The frequency band of the optical signal may be, for example, an L-band. Also, the idler light may be generated on the low frequency side of the optical signal.

Figure 1:
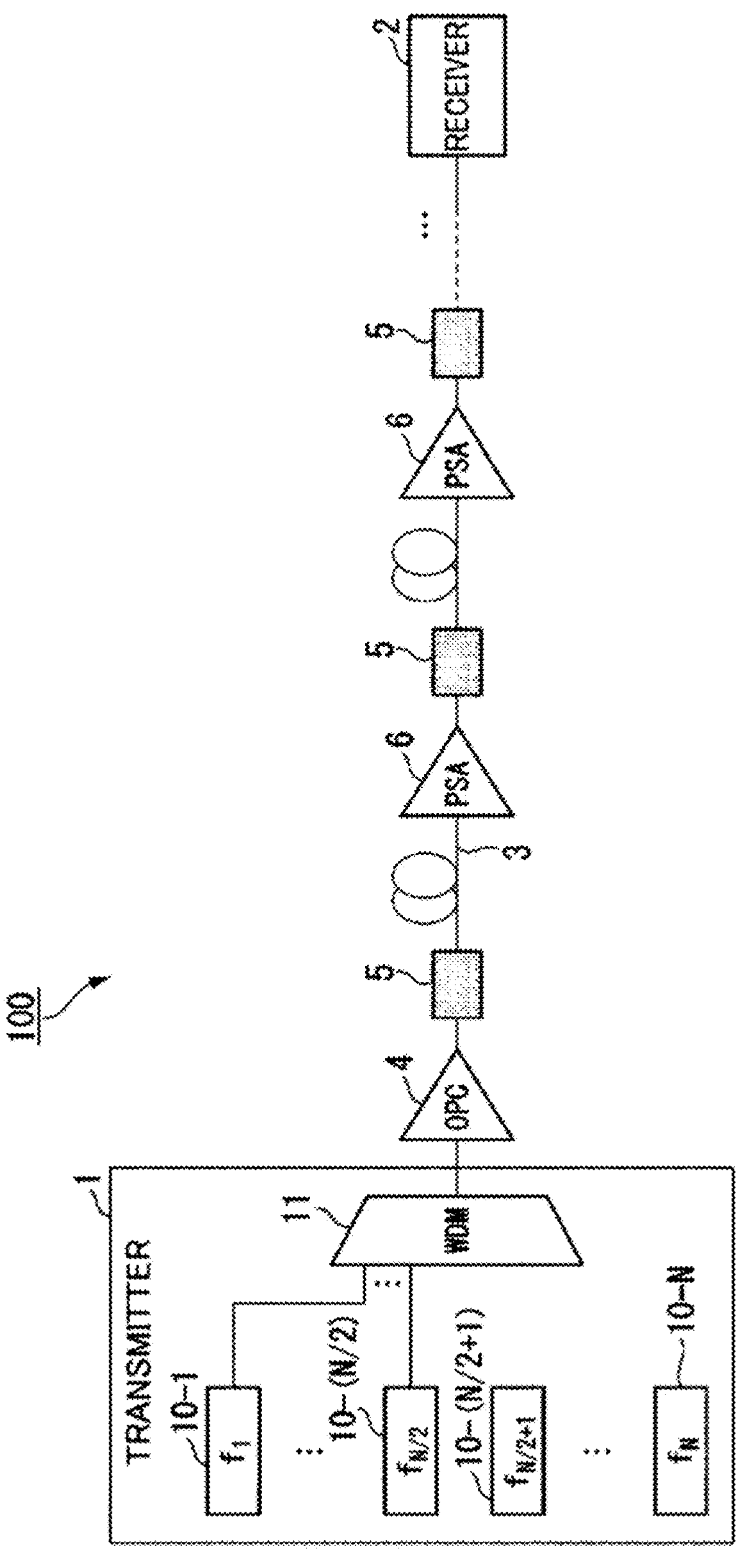
FIG. 1 is a diagram showing an example of a configuration of a transmission system according to an embodiment.

FIG. 1 is a diagram showing an example of a configuration of a transmission system 100 according to an embodiment. The transmission system 100 is a transmission system which transmits optical signals.

The transmission system 100 includes a transmitter 1, a receiver 2, a transmission line 3, an OPC 4, one or more optical power adjustment parts 5, and one or more PSAs 6. The transmitter 1 outputs N kinds of optical signals ranging from a signal with frequency $f_1$ to a signal with frequency $f_n$. Note that N is a natural number. Furthermore, the frequencies have a relationship of $f_1 < \ldots < f_{n/2} < f_{(N/2+1)} < \ldots < N$. That is to say, $f_n$ has a higher frequency as a numerical value of a subscript increases. n is a natural number.

In order to explain the transmission system 100 as an example in which the frequency band of the optical signal is the C-band as described above, the frequency $f_1$ is the lowest frequency of the C-band and the frequency $f_N$ is the highest frequency of the C-band. If the frequency band of the optical signal is the L-band, the frequency $f_1$ is the lowest frequency of the L-band and the frequency $f_N$ is the highest frequency of the L-band.

The transmitter 1 includes N signal sources 10 of signal sources 10-1 to 10-N and a WDM 11. The signal source 10-*m* outputs an optical signal of frequency $f_n$. For example, the signal source 10-(N/2) outputs an optical signal of frequency $f_{(N/2)}$, and the signal source 10-(N/2+1) outputs an optical signal of frequency $f_{(N/2+1)}$.

The WDM 11 is a WDM coupler. The WDM 11 multiplexes the optical signals output from the signal sources 10-1 to 10-N and outputs a combined wave obtained by multiplexing. The optical signal output from the transmitter 1 is more specifically a composite wave output from the WDM 11. That is to say, the optical signal output from the transmitter 1 is more specifically a synthesized wave of N kinds of optical signals ranging from a signal with frequency $f_1$ to a signal with frequency $f_N$. Hereinafter, a composite wave of N kinds of optical signals from the signal of frequency $f_1$ to the signal of frequency $f_N$ will be referred to as signal light.

Note that the signal source 10-*m* may be a device capable of generating an optical signal such as a laser or may be a device that outputs an optical signal input from a device external to the transmission system 100 toward the WDM 11.

Figure 2:
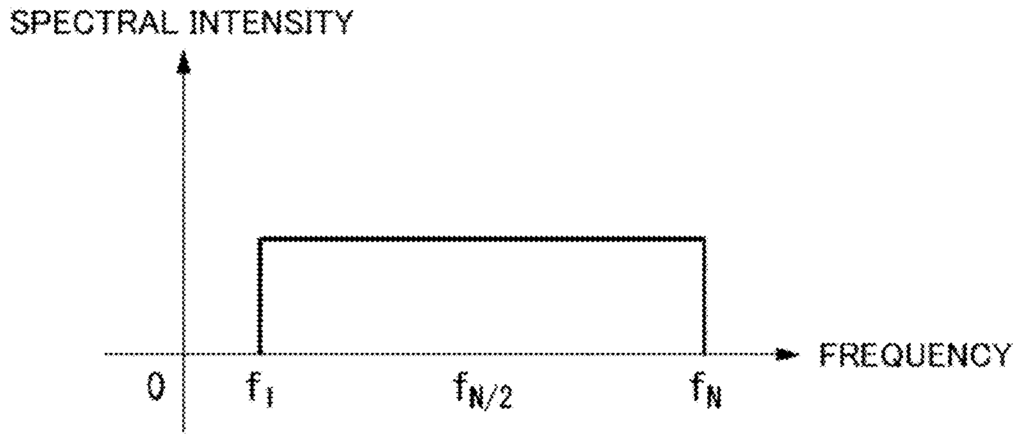
FIG. 2 is an explanatory drawing for explaining a frequency spectrum of signal light output by a transmitter 1 according to the embodiment.

FIG. 2 is an explanatory diagram showing a frequency spectrum of signal light output from the transmitter 1 according to the embodiment. FIG. 2 shows the transmission system 100 which can use any frequency of the C-band as the frequency of the optical signal. That is to say, the transmission band in the transmission system 100 is the entire C-band.

The description is provided with reference to FIG. 1 again. The receiver 2 is connected to the transmission line 3 and receives optical signals propagating through the transmission line 3. The transmission line 3 is a transmission line for transmitting optical signals from the transmitter 1 to the receiver 2 via the OPC 4, one or more optical power adjustment parts 5, and one or more PSAs 6. Therefore, the optical signal received by the receiver 2 is, specifically, an optical signal transmitted from the transmitter 1 and propagated to the receiver 2 through the process of amplitude attenuation and amplification. That is to say, the optical signal received by the receiver 2 is signal light. Note that the transmission line 3 is specifically an optical fiber.

The OPC 4 is an optical phase conjugate converter (OPC). Signal light is input to the OPC 4. Therefore, the OPC 4 receives signal light and outputs signal light and idler light (that is, phase conjugate light). More specifically, the OPC 4 outputs a combined wave of signal light and idler light. Hereinafter, the light output from the OPC 4 (that is, the combined wave of the received light and the idler light) will be referred to as OPC light. The OPC Light propagates from the OPC 4 to the receiver 2 while being amplified or attenuated using the optical power adjustment part 5 or the PSA 6.

Figure 3:
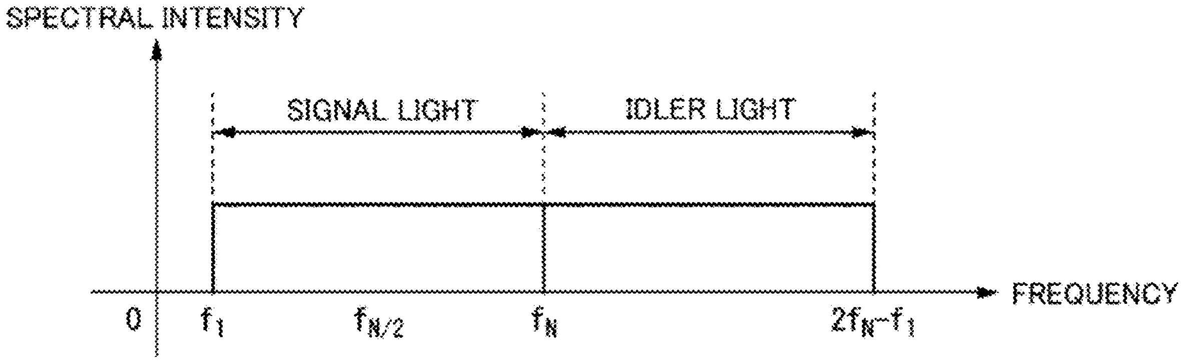
FIG. 3 is an explanatory drawing for explaining a frequency spectrum of OPC light according to the embodiment.

FIG. 3 is an explanatory diagram for explaining a frequency spectrum of OPC light according to the embodiment. FIG. 3 shows that the band of OPC light is a band from frequency $f_1$ to frequency $(2f_n-f_1)$. The frequencies $f_1$ to $f_N$ are the frequencies of the signal light, and the frequencies $f_N$ to $(2f_n-f_1)$ are the frequencies of the idler light.

The description is provided with reference to FIG. 1 again. The optical power adjustment part 5 adjusts the power of the input OPC light. That is to say, the optical power adjustment part 5 adjusts the power of the input signal light and idler light. Adjustment specifically means amplifying or attenuating power. An example of a specific configuration of the optical power adjustment part 5 will be described later.

The PSA 6 is a phase-sensitive amplifier (PSA). The PSA 6 receives the OPC light. The PSA 6 amplifies the input OPC light and outputs it.

Figure 4:
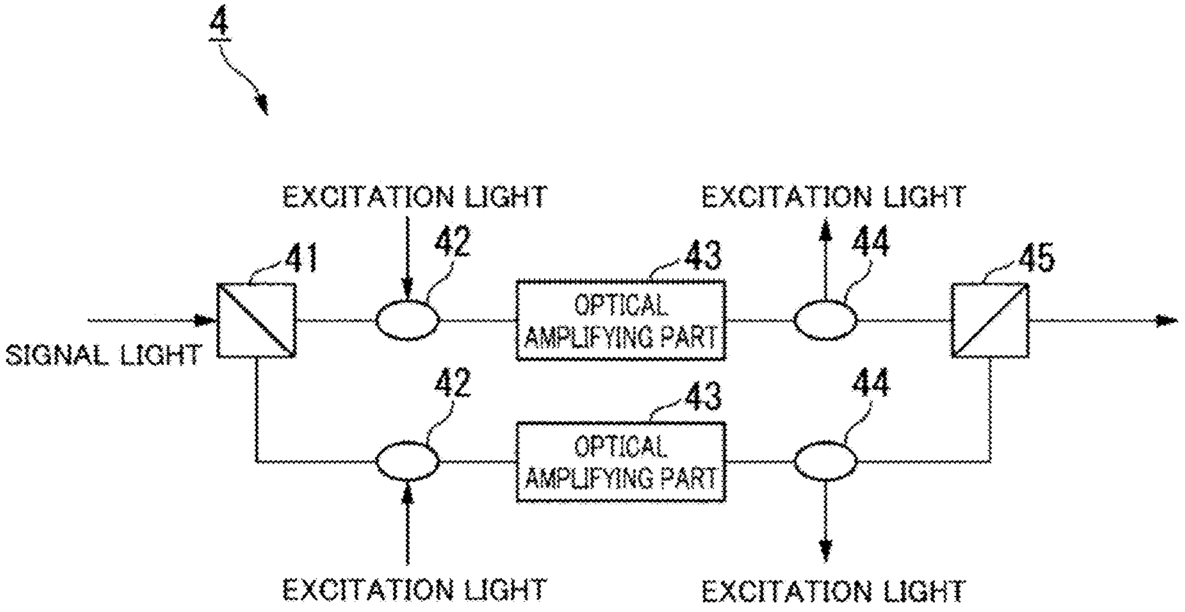
FIG. 4 is a drawing showing an example of a configuration of an OPC 4 according to the embodiment.

FIG. 4 is a diagram showing an example of a configuration of the OPC 4 according to the embodiment. The OPC 4 may have any configuration as long as it is an optical phase conjugate converter (OPC). In addition, FIG. 4 shows an example thereof. Before explaining the configuration of the OPC 4, optical parametric amplification will be explained first.

Optical Parametric Amplification

Since optical parametric amplification generally has polarization dependence, a polarization diversity configuration in which the input light is split into orthogonal polarization components and recombined after each processing is used.

Non-linear optical media for optical parametric amplification include third-order non-linear optical media typified by optical fibers and second-order non-linear optical media typified by periodically poled lithium niobate.

Signal light is incident on the OPC 4. The OPC 4 includes a polarization demultiplexing part 41, an excitation light multiplexing part 42, an optical amplifying part 43, an excitation light demultiplexing part 44, and a polarization multiplexing part 45. The polarization demultiplexing part 41 splits the incident light into two lights having orthogonal planes of polarization. The light incident on the polarization demultiplexing part 41 is signal light. The polarization demultiplexing part 41 is, for example, a polarization beam splitter. The excitation light multiplexing part 42 multiplexes the signal light separated using the polarization demultiplexing part 41 and the excitation light incident from the outside. Hereinafter, each signal light separated by the polarization demultiplexing part 41 will be referred to as polarized signal light. The excitation light multiplexing part 42 is, for example, a WDM coupler. The excitation light multiplexing part 42 may be, for example, a dichroic mirror. The light output from the excitation light multiplexing part 42 is incident on the optical amplifying part 43.

The optical amplifying part 43 includes a non-linear optical medium. The light incident on the optical amplifying part 43 is incident on the non-linear optical medium. The light incident on the optical amplifying part 43 is amplified using optical parametric amplification through the non-linear optical medium. The non-linear optical medium used in the optical amplifying part 43 will be described below.

Regarding Non-linear Optical Medium Used in OPC 4

The non-linear optical medium used in the OPC 4 is a non-linear optical medium designed in advance so that the center frequency of the amplification band does not exist within the transmission band, but the center frequency of the amplification band exists at the end of a first band. The first band is a band supported by a transmitter 1 and a receiver 2. More specifically, the band supported by the transmitter 1 and the receiver 2 is a frequency band in which the sensitivity of the light reception of the receiver 2 is a predetermined level or more among the frequency bands in which the transmitter 1 can output an optical signal with a predetermined intensity or more.

The first band is, for example, a C-band. Note that the non-linear optical medium used in the OPC 4 is a non-linear optical medium provided in the optical amplifying part 43. The center frequency of the amplification band is determined through the phase matching condition of the non-linear optical medium and is a frequency predetermined through the chromatic dispersion of the medium, the frequency of the excitation light, and the like.

The non-linear optical medium in the OPC 4 is, for example, an OPA medium in which the center of the amplification band is located at the end of the transmission band of existing single-band transmission systems such as a C-band. The amplification bandwidth of this OPA medium covers, for example, 8 THz or more. Note that NPLs 1 and 2 describe an example of non-linear optical media having an amplification bandwidth of 8 THz or more.

Note that the center of the amplification band of the non-linear optical medium used in the OPC 4 does not necessarily need to be the end of the first band. The center of the amplification band of the non-linear optical medium used in the OPC 4 may be positioned between the first band and the second band. Note that the second band is a higher or lower frequency band than the first band.

The excitation light will be explained in more detail. The frequency of the excitation light is $f_N$ when a third-order non-linear optical medium is used and $2_{fN}$ which is a second harmonic is used when a second-order non-linear optical medium is used. In the case of a second-order non-linear optical medium, for example, a configuration is used in which $f_N$ continuous light is converted to $2_{fN}$ by second harmonic generation (SRG) using the non-linear optical medium. It is preferable that the excitation light used for each polarization component be output from the same light source from the viewpoint of frequency synchronization and phase control with the excitation light in the PSA 6.

The excitation light demultiplexing part 44 separates the light amplified by the optical amplifying part 43 into polarized signal light and excitation light. The excitation light demultiplexing part 44 is, for example, a WDM coupler. The excitation light demultiplexing part 44 may be, for example, a dichroic mirror. The excitation light demultiplexing part 44 outputs the polarized signal light toward the polarization multiplexing part 45.

The polarization multiplexing part 45 multiplexes and outputs two incident polarized signal lights having planes of polarization orthogonal to each other. The polarization multiplexing part 45 is, for example, a polarization beam splitter.

Thus, the OPC 4 generates phase conjugate light of the input signal light through an optical parametric amplification process using a non-linear optical medium having an amplification band center at the end of the first band.

Figure 5:
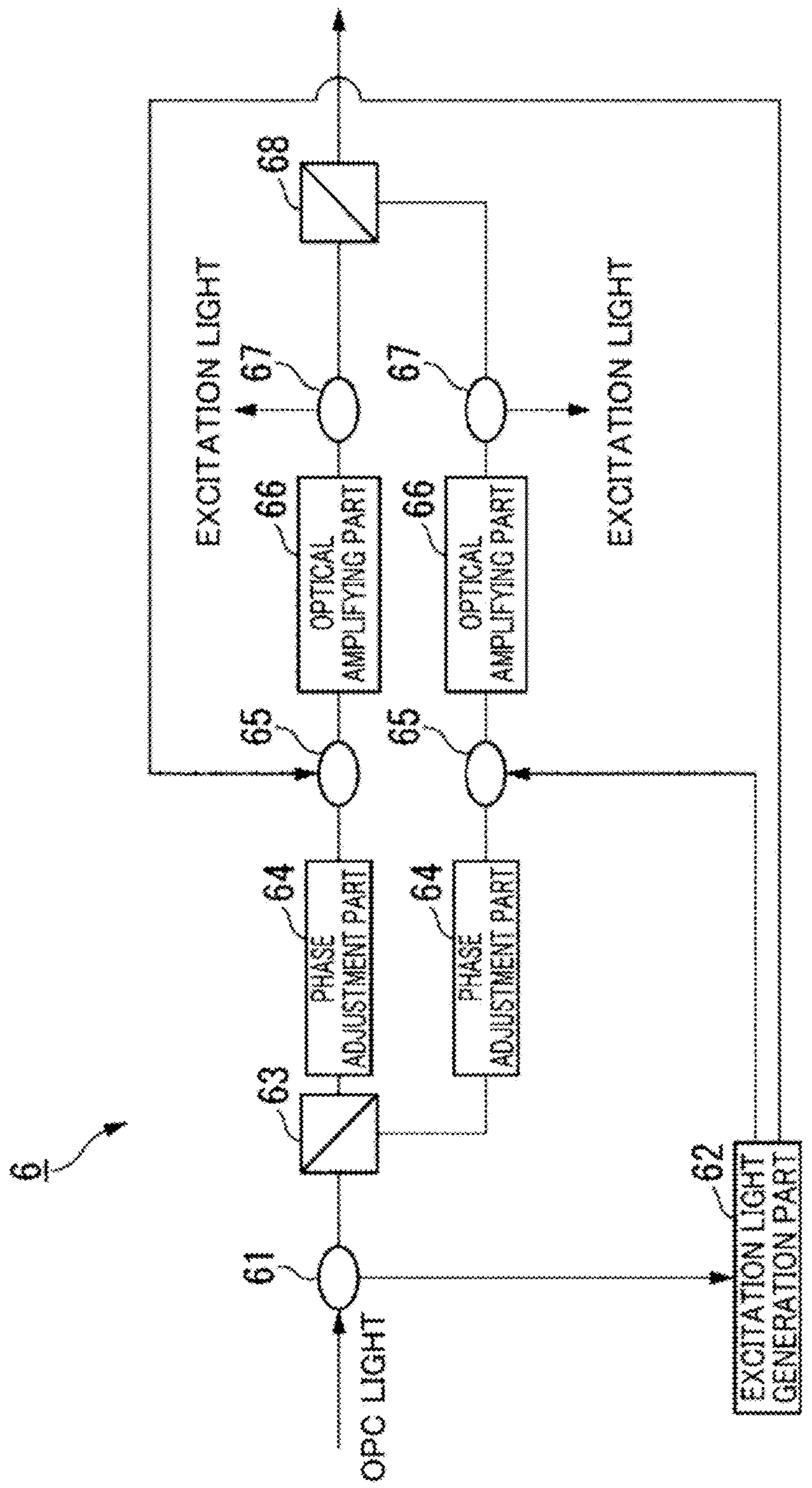
FIG. 5 is a drawing showing an example of a configuration of a PSA 6 according to the embodiment.

FIG. 5 is a diagram showing an example of a configuration of the PSA 6 according to the embodiment. The PSA 6 may have any configuration as long as it is a phase-sensitive amplifier (PSA) and FIG. 5 shows an example thereof. Although the PSA 6 also uses a non-linear optical medium, in the PSA 6 as well as in the OPC 4, the center of the amplification band of the non-linear optical medium is designed in advance to be located at the end of the band of the signal light. The PSA 6 includes a synchronization light demultiplexing part 61, an excitation light generation part 62, a polarization demultiplexing part 63, a phase adjustment part 64, an excitation light multiplexing part 65, an optical amplifying part 66, an excitation light demultiplexing part 67, and a polarization multiplexing part 68.

The synchronization light demultiplexing part 61 separates the input light (that is, OFC light) into a plurality of lights with different propagation directions. The synchronization Light demultiplexing part 61 is, for example, a half mirror. The excitation light generation part 62 generates excitation light. The excitation light generation part 62 is, for example, a laser. The excitation light generated by the excitation light generation part 62 is light in which the excitation light conditions are satisfied. The excitation Light conditions will be described later.

The polarization demultiplexing part 63 separates the incident light into two lights having orthogonal planes of polarization. The light incident on the polarization demultiplexing part 63 is OPC light. The polarization demultiplexing part 63 is, for example, a polarization beam splitter. Hereinafter, each OPC light separated using the polarization demultiplexing part 63 is referred to as polarized OPC light.

The phase adjustment part 64 adjusts the phase of the incident OPC light. Adjusting the phase of the incident OFC light specifically means changing the phase of the incident OPC light by a predetermined amount. Note that the OPC light incident on the phase adjustment part 64 is the polarized OPC light output from the polarization demultiplexing part 63. Therefore, the light output from the phase adjustment part 64 is polarized OPC light.

In order to perform phase sensitive amplification, it is necessary that a phase relationship between the signal light, the idler light, and the excitation light be an appropriate phase relationship. An appropriate phase relationship is a phase relationship in which the phase conjugate light of the idler light generated at the frequency of the signal light as a result of non-linear interaction between the idler light and the excitation light is constructively combined with the signal light. The phase adjustment part 64 changes the phase of the signal light by a predetermined amount to bring the phase relationship between the signal light, the idler light, and the excitation light into an appropriate phase relationship.

In FIG. 5, the phase adjustment part 64 is positioned on the signal light line. However, the PSA 6 does not necessarily need to include the phase adjustment part 64. When the PSA 6 does not have the phase adjustment part 64, the transmitter 1 may adjust the phase relationship among the signal light, idler light, and excitation light in advance.

Note that, in order to make the phase relationship between the signal light, the idler light, and the excitation light appropriate, the relative phase may be adaptively controlled using a piezo-driven fiber stretcher or the like. The phase adjustment part 64 may be, for example, a waveguide phase modulator.

The excitation light multiplexing part 65 multiplexes the polarized OPC light output from the phase adjustment part 64 and the excitation light generated by the excitation light generation part 62. The excitation light multiplexing part 65 is, for example, a WDM coupler. The excitation light multiplexing part 65 may be, for example, a dichroic mirror. The light output from the excitation light multiplexing part 65 is incident on the optical amplifying part 66.

The optical amplifying part 66 includes a non-linear optical medium. The light incident on the optical amplifying part 66 is incident on the non-linear optical medium. The light incident on the optical amplifying part 66 is amplified through optical parametric amplification using the non-linear optical medium. The non-linear optical medium used in the optical amplifying part 66 will be described below.

Regarding Non-Linear Optical Medium Used in PSA 6

The non-linear optical medium used in the PSA 6 is a non-linear optical medium designed in advance so that the center frequency of the amplification band does not exist within the transmission band, but the center frequency of the amplification band exists at the end of the first band. Note that the non-linear optical medium used in the PSA 6 is the non-linear optical medium provided in the optical amplifying part 66. The center frequency of the amplification band is determined under the phase matching condition of the non-linear optical medium and is a frequency predetermined through the chromatic dispersion of the medium, the frequency of the excitation light, and the like.

The non-linear optical medium in the PSA 6 is, for example, the non-linear optical medium described in NPLs 1 and 2. The non-linear optical media described in NPLs 1 and 2 are OPA media in which the center of the amplification band is located at the end of the transmission band of existing single-band transmission systems such as a C-band. The amplification bandwidth of this OPA medium covers, for example, 8 THz or more.

Note that the center of the amplification band of the non-linear optical medium used in PSA 6 does not necessarily have to be the end of the first band. The center of the amplification band of the non-linear optical medium used in the PSA 6 may be located between the first band and the second band.

The excitation light will be explained in more detail. The frequency of the excitation light is $f_N$ when a third-order non-linear optical medium is used and $2_{fN}$ which is a second harmonic is used when a second-order non-linear optical medium is used. In the case of a second-order non-linear optical medium, for example, a configuration is used in which fa continuous light is converted to $2_{fN}$ through second harmonic generation (SAG) using the non-linear optical medium. It is preferable that the excitation Light used for each polarization component be output from the same light source.

The excitation light demultiplexing part 67 separates the light amplified using the optical amplifying part 66 into polarized OPC light and excitation light. The excitation light demultiplexing part 67 is, for example, a WDM coupler. The excitation light demultiplezing part 67 may be, for example, a dichroic mirror. The excitation light demultiplexing part 67 outputs the polarized OPC light toward the polarization multiplexing part 68.

The polarization multiplexing part 68 multiplexes and outputs two incident polarized OPC lights having planes of polarization orthogonal to each other. The polarization multiplexing part 68 is, for example, a polarization beam splitter.

Note that, in the PSA 6, the frequency of the excitation light needs to be synchronized with the carrier component of the pair of signal light and idler light by optical injection locking or the like. The carrier component matches the excitation light at the OPC 4. Thus, for frequency synchronization, the PSA 6 taps a part of the input light at the time of input. A specific example of the taps of some of the input light is separation using the synchronization light demultiplexing part 61 described above.

In the example of FIG. 5, the tapped component is a pair of signal light and idler light (that is, OPC light) itself. However, the tapped component may be pilot light prepared in advance. When pilot light is used, a part of the excitation light of the frequency $f_N$ used in the OPC 4 is tapped and co-propagated with the signal light. Note that, when a secondary non-linear optical medium is used as the non-linear optical medium, it is preferable that the pilot light be the original continuous light before being converted into the secondary harmonic.

Excitation Light Condition

The excitation light condition is that it is frequency locked to the tapped component by optical phase locking or optical injection locking. Therefore, the excitation light generation part 62 generates excitation light whose frequency is synchronized with the tapped component through optical phase locking or optical injection locking.

The signal light and the idler light propagated in different transmission bands are coherently combined in the PSA 6 by configuring the PSA 6 in this way. As a result, the PSA 6 can obtain phase sensitive amplification characteristics.

In this way, the PSA 6 performs phase sensitive amplification through interaction among the three light waves of the input signal light, the phase conjugate light, and the excitation light through the optical parametric amplification process using a non-linear optical medium having the center of the amplification band at the end of the first band.

Details of Optical Power Adjustment Part 5

The optical power adjustment part 5 will be described in more detail below. Generally, a transmission line through which an optical signal is transmitted has wavelength dependence of transmission loss. It is known that, in a general optical fiber, the wavelength varies relatively gently within the C-band, but significantly varies within the S-band.

On the other hand, in the ND-PSA, if there is a difference in optical power between the signal light and the idler light input to the amplifier, it is known that the noise figure deteriorates in accordance with the magnitude of the difference.

Therefore, when the signal light in the transmission system 100 is C-band light and the idler light is S-band light, particularly, the farther away from the center of the amplification band, the greater the power difference between the signal light and the idler light at the input end of the PSA 6 (that is, the synchronization light separation section 61).

Figure 6:
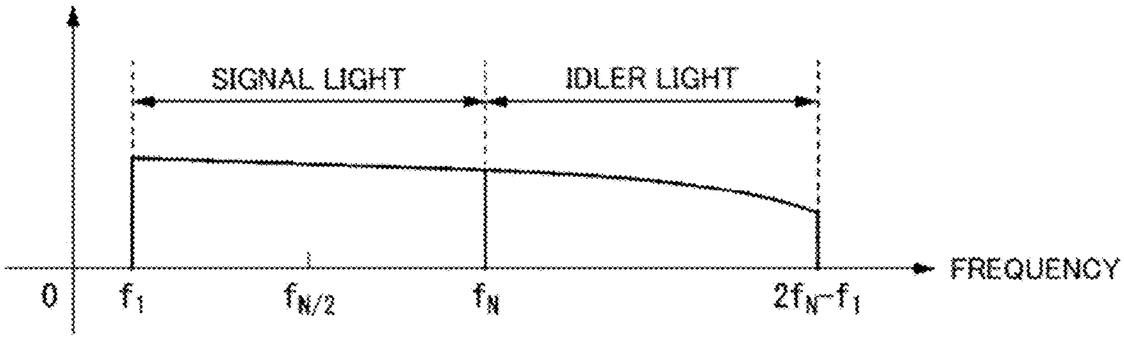
FIG. 6 is a diagram showing an example of a frequency spectrum of OPC light in a synchronization light demultiplexing part 61 according to the embodiment.

FIG. 6 is a diagram showing an example of a frequency spectrum of the OPC light in the synchronization light demultiplexing part 61 according to the embodiment. FIG. 6 shows that there is a difference between the power of the idler light and the power of the signal light.

Thus, the optical power adjustment part 5 reduces this power difference (that is, the difference in power between the signal light and the idler light). Specifically, the optical power adjustment part 5 reduces the power difference between the signal light and the idler light by adjusting the transmission power to the transmission line using an optical amplifier or an optical attenuator. Note that this difference in power is caused by the difference in transmission loss caused by the difference in transmission band between the signal light and the idler light.

Figure 7:
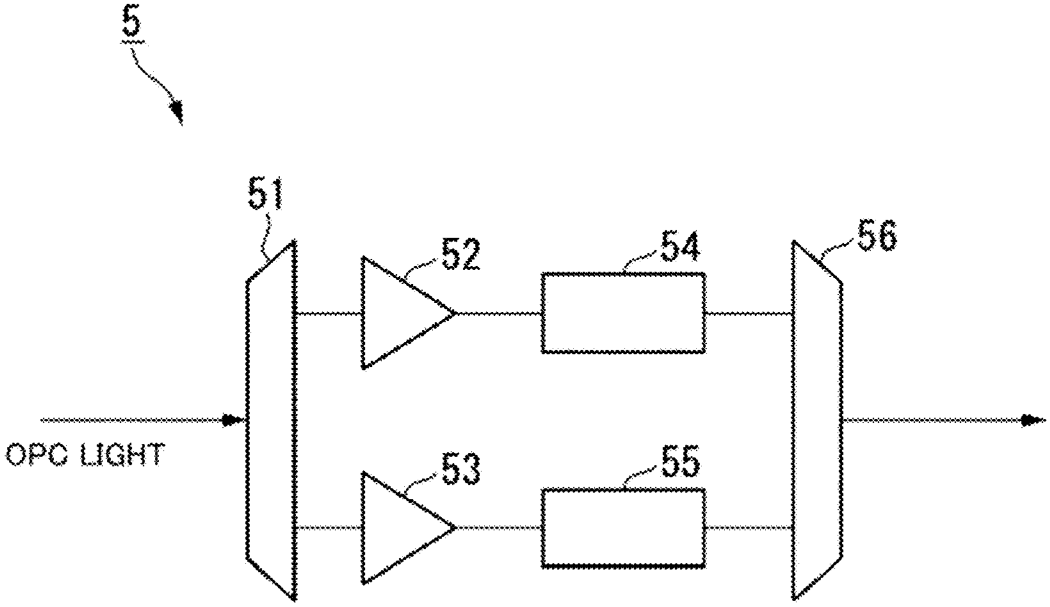
FIG. 7 is a diagram showing an example of a configuration of an optical power adjustment part 5 according to the embodiment.

FIG. 7 is a diagram showing an example of a configuration of the optical power adjustment part 5 according to the embodiment. More specifically, FIG. 7 shows an example of the configuration of the optical power adjustment part 5 which uses an optical amplifier to reduce the power difference between the idler light and the signal light.

The optical power adjustment part 5 includes a band demultiplexer 51, a first band optical amplifier 52, a second band optical amplifier 53, a first gain equalization filter 54, a second gain equalization filter 55, and a band multiplexer 56.

The OPC light incident on the optical power adjustment part 5 is first incident on the band demultiplexer 51. The band demultiplexer 51 is a band demultiplexer configured to propagate light whose frequency is within a predetermined first band to the first path and propagates light whose frequency is within a predetermined second band to a second path different from the first path. That is to say, the band demultiplexer 51 is a band demultiplexer which demultiplexes incident light in accordance with a frequency. When the first band is the C-band, the second band is for example the S-band.

The first band optical amplifier 52 amplifies the light which has been demultiplexed using the band demultiplexer 51 and propagated along the first path. The second band optical amplifier 53 amplifies the light which has been demultiplexed using the band demultiplexer 51 and propagated through the second path.

The first gain equalization filter 54 is a gain equalization filter which flattens the gain curve in the first band. The Light amplified using the first band optical amplifier 52 and propagated through the first path is incident on the first gain equalization filter. Therefore, the first gain equalization filter 54 has an inverse characteristic of the wavelength dependence of the transmission loss so that the power spectrum is uniform at the input end of the next PSA 6 located at the subsequent stage.

The second gain equalization filter 55 is a gain equalization filter which flattens the gain curve in the second band. The light amplified using the second band optical amplifier 53 and propagated through the second path is incident on the second gain equalization filter. Therefore, the second gain equalization filter 55 has the inverse characteristics of the wavelength dependence of the transmission loss so that the power spectrum is uniform at the input end of the next PSA 6 located at the subsequent stage.

The band multiplexer 56 multiplexes the light output from the first gain equalization filter 54 and the light output from the second gain equalization filter 55.

Note that, when the amplification gain in the PSA 6 is sufficient and the gain equalization filter can flatten the gain curve for the entire band of the total band of the frequency band of the signal light and the frequency band of the idler light, there is no need for the OPC light to be separated into two transmission bands in the optical power adjustment part 5. In such a case, there may simply be a gain equalization filter immediately after the PSA 6. That is to say, the optical power adjustment part 5 may simply be one gain equalization filter.

In the transmission system 100 configured in this manner, the OPC 4 generates idler light in a band different from a band predetermined as a transmission band. For this reason, there is no need to use a part of the predetermined transmission band as idler light and the entire band can be used for signal light transmission. Therefore, the transmission system 100 can increase the transmission capacity of the transmission system for transmitting optical signals, compared to when idler light is generated in a predetermined band.

Furthermore, in the transmission system 100 configured in this way, since the transmission capacity is increased compared to the case in which the idler light is generated in a predetermined band, the transmission distance can be increased.

Modified Example

Note that the optical power adjustment part 5 does not necessarily need to exist. Also, it is not always necessary to have the optical power adjustment part 5 for the OPC 4 and all the PSA 6 as shown in FIG. 1. The optical power adjustment part. 5 may exist for only a part of the OPC 4 and all the PSA 6.

Note that the first band is, for example, a lower frequency band than the boundary frequency between the C-band and the S-band and the second band is, for example, a higher frequency band than the boundary frequency between the C-band and the S-band. Thus, as described above, the first band is, for example, the C-band and the second band is, for example, the S-band. Specifically, the boundary frequency between the C-band and the S-band is 1530 nm.

Note that the frequencies of the signal light and the idler light do not necessarily need to be positioned in the C-band and the S-band as long as they are positioned in bands defined differently from each other. For example, when there are two frequency bands with different names such as an "X1-band" and an "X2-band", the frequency of the signal light may be located in "X1-band" and the frequency of the idler light may be located in "X1-band". In such a case, the "X1-band" is the first band and the "X2-band" is the second band. That is to say, the first band may be one of two frequency bands with different names and the second band may be the other of the frequency bands with different names.

Note that, when the signal sources 10-1 to 10-N are devices capable of controlling the operation of light output such as lasers, the transmission system 100 may include a device configured to control the operation of signal sources 10-1 to 10-N. Hereinafter, the transmission system 100 including a device configured to control the operations of the signal sources 10-1 to 10-N will be referred to as a transmission system **100*a***.

Figure 8:
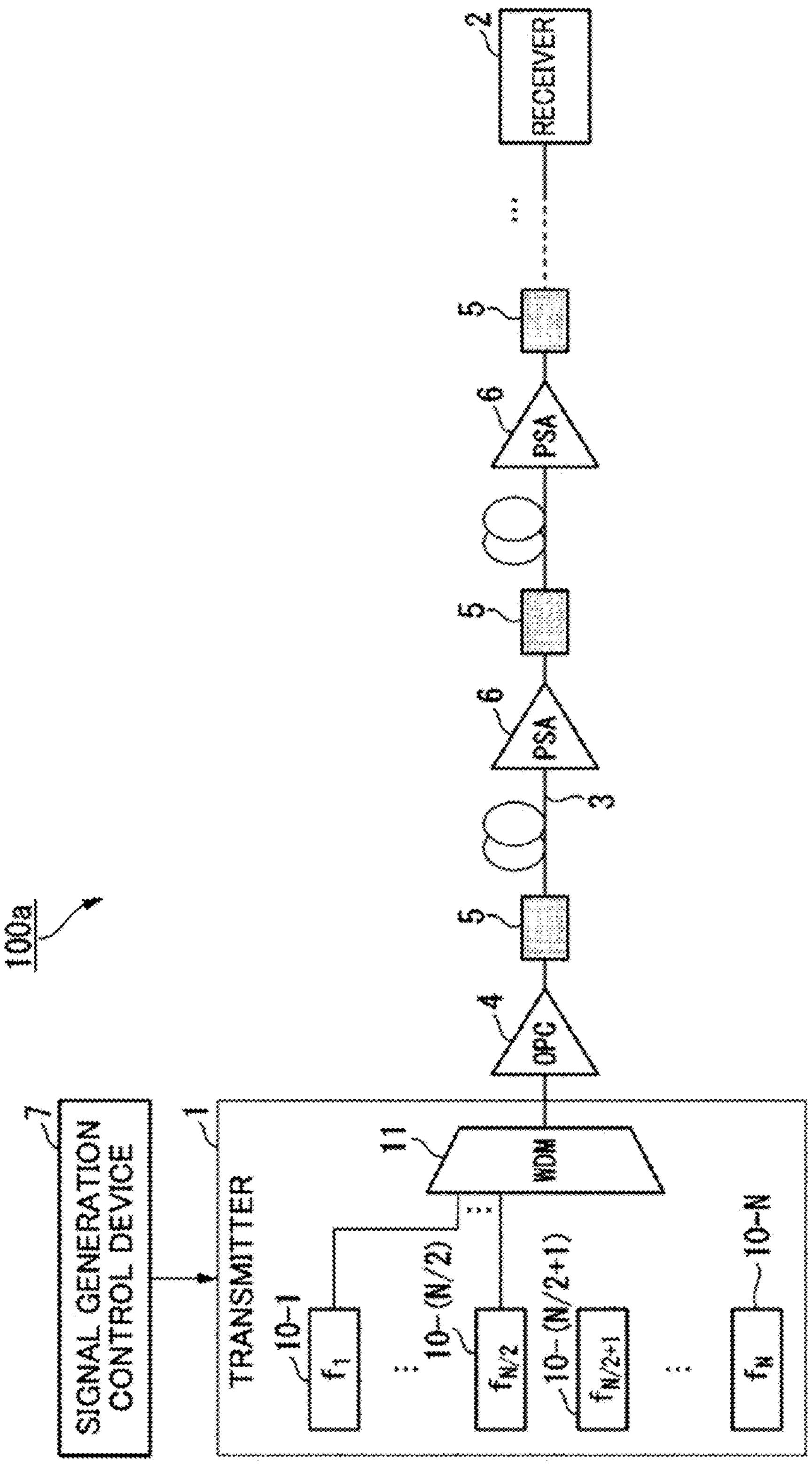
FIG. 8 is a diagram showing an example of a configuration of a transmission system 100 according to a modified example.

FIG. 8 is a diagram showing an example of a configuration of the transmission system **100*a* according to a modified example. The transmission system 100*a* includes a transmitter 1, a receiver 2, a transmission line 3, an OPC 4, one or more optical power adjustment parts 5, and one or more PSA 6, and further includes a signal generation control device 7. That is to say, the transmission system 100***a* differs from the transmission system 100 in that the signal generation control device 7 is provided. The signal generation control device 7 controls the operations of the signal sources 10-1 to 10-N. More specifically, the signal generation control device 7 controls the operations of the signal sources 10-1 to 10-N and controls a timing, frequency or waveform for generating signals from the signal sources 10-1 to 10-N.

Figure 9:
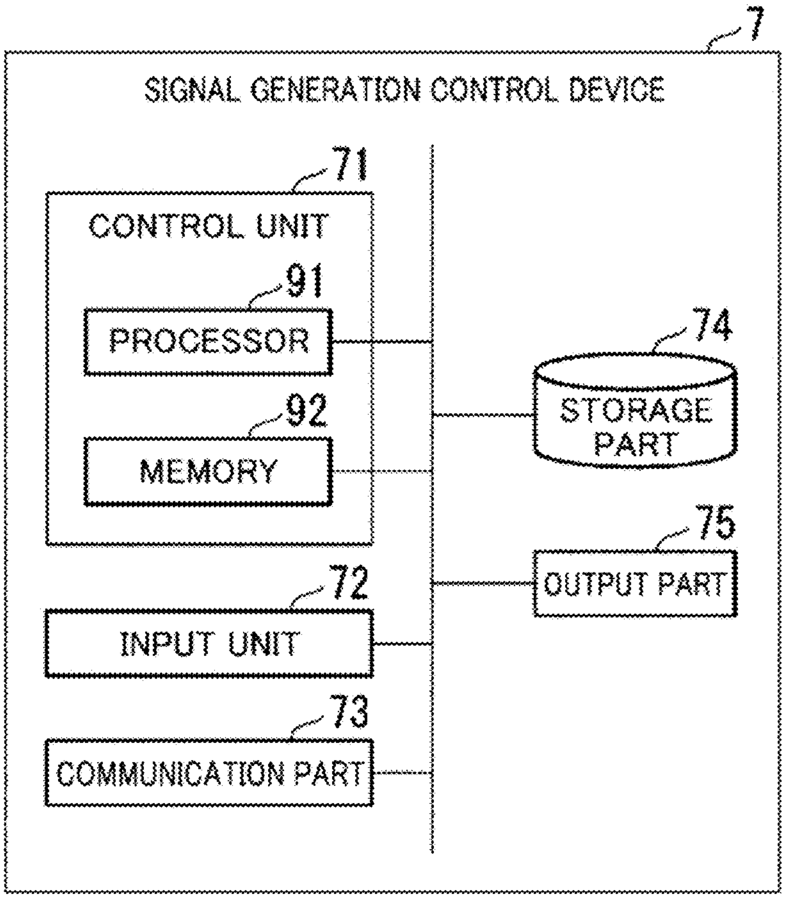
FIG. 9 is a drawing showing an example of a hardware configuration of a signal generation control device 7 according to the modified example.

FIG. 9 is a diagram showing an example of a hardware configuration of the signal generation control device 7 according to the modified example. The signal generation control device 7 includes a control part 71 including a processor 91 such as a central processing unit (CPU) and a memory 92 connected via a bus and executes a program. The signal generation control device 7 functions as a device including a control part 71, an input part 72, a communication part 73, a storage part 74, and an output part 75 by executing a program.

More specifically, the processor 91 reads a program stored in the storage part 74 and causes the memory 92 to store the read program. The signal generation control device 7 functions as a device including the control part 71, the input part 72, the communication part 73, the storage part 74, and the output part 75 using the processor 91 configured to execute the program stored in the memory 92.

The control part 71 controls operations of various functional parts included in the signal generation control device 7 such as the input part 72, the communication part 73, the storage part 74, and the output part 75. The control part 71, for example, records various information in the storage part 74. The control part 71, for example, controls operations of the signal sources 10-1 to 10-N via the communication part 73.

The input part 72 includes input devices such as a mouse, a keyboard, and a touch panel. The input part 72 may be configured as an interface through which these input devices are connected to the signal generation control device 7. The input part 72 receives an input of various information to the signal generation control device 7. The waveform of each light generated by the signal sources 10-1 to 10-N by controlling the operation of the signal sources 10-1 to 10-N by the control part 71 is, for example, a waveform indicating information input to the input part 72 and desired to be transmitted to the receiver 2. That is to say, the control part 71 controls the operation of the signal sources 10-1 to 10-N, for example, to generate optical signals representing waveforms representing information input to the input part 72.

The communication part 73 includes a communication interface through which the signal generation control device 7 is connected to an external device. The communication part 73 communicates with an external device in a wired or wireless manner. The external devices are, for example, the signal sources 10-1 to 10-N.

The storage part 74 is configured using a computer-readable storage medium device such as a magnetic hard disk device or a semiconductor storage device. The storage part 74 stores various information concerning the signal generation control device 7. The storage part 74, for example, stores information input via the input part 72 or the communication part 73.

The output part 75 outputs various information. The output part 75 includes a display device such as a cathode ray tube (CRT) display, a liquid crystal display, an organic electro-luminescence (EL) display, or the like. The output part 75 may be configured as an interface through which these display devices are connected to the signal generation control device 7. The output part 75, for example, outputs information input to the input part 72.

Figure 10:
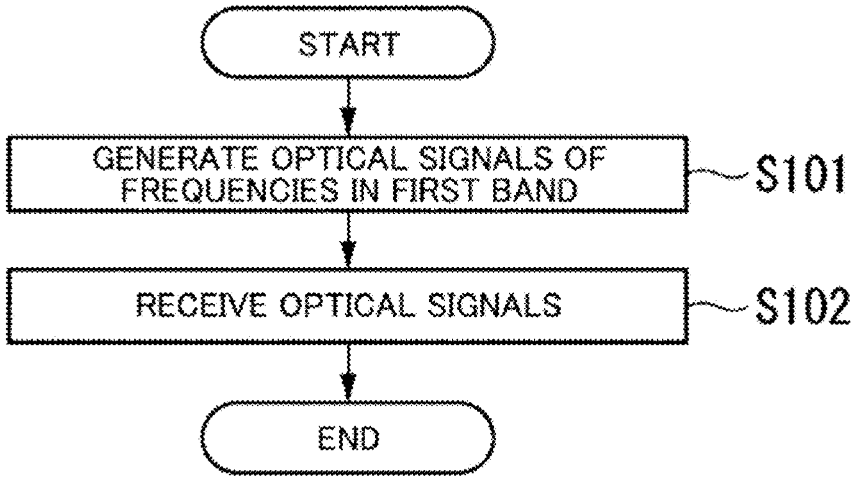
FIG. 10 is a flowchart for describing an example of a flow of processing performed in a transmission system 100 according to the modified example.

FIG. 10 is a flowchart for describing an example of a flow of processing executed using the transmission system 100 in the modified example. The control part 71 controls the operation of the signal sources 10-1 to 10-N to cause each of the signal sources 10-1 to 10-N to generate optical signals of frequencies in the first band (Step S101). Subsequently, the receiver 2 receives optical signals which have arrived via the OPC 4, one or more optical power adjustment parts 5 and one or more PSAs 6 and are generated in Step S101 (Step S102).

Note that the OPC 4 is an example of a phase conjugate light generation part. Note that the PSA 6 is an example of an optical phase sensitive amplifying part.

As described above, phase-sensitive amplification requires that the signal light, idler light, and excitation light have an appropriate phase relationship. Furthermore, the appropriate phase relationship is achieved by, for example, adaptively controlling the relative phases among the signal light, idler light, and excitation light. An example of a device which performs adaptive control will be described below. Hereinafter, the transmission system 100 including the device which performs adaptive control will be referred to as a transmission system 100*b*.

Figure 11:
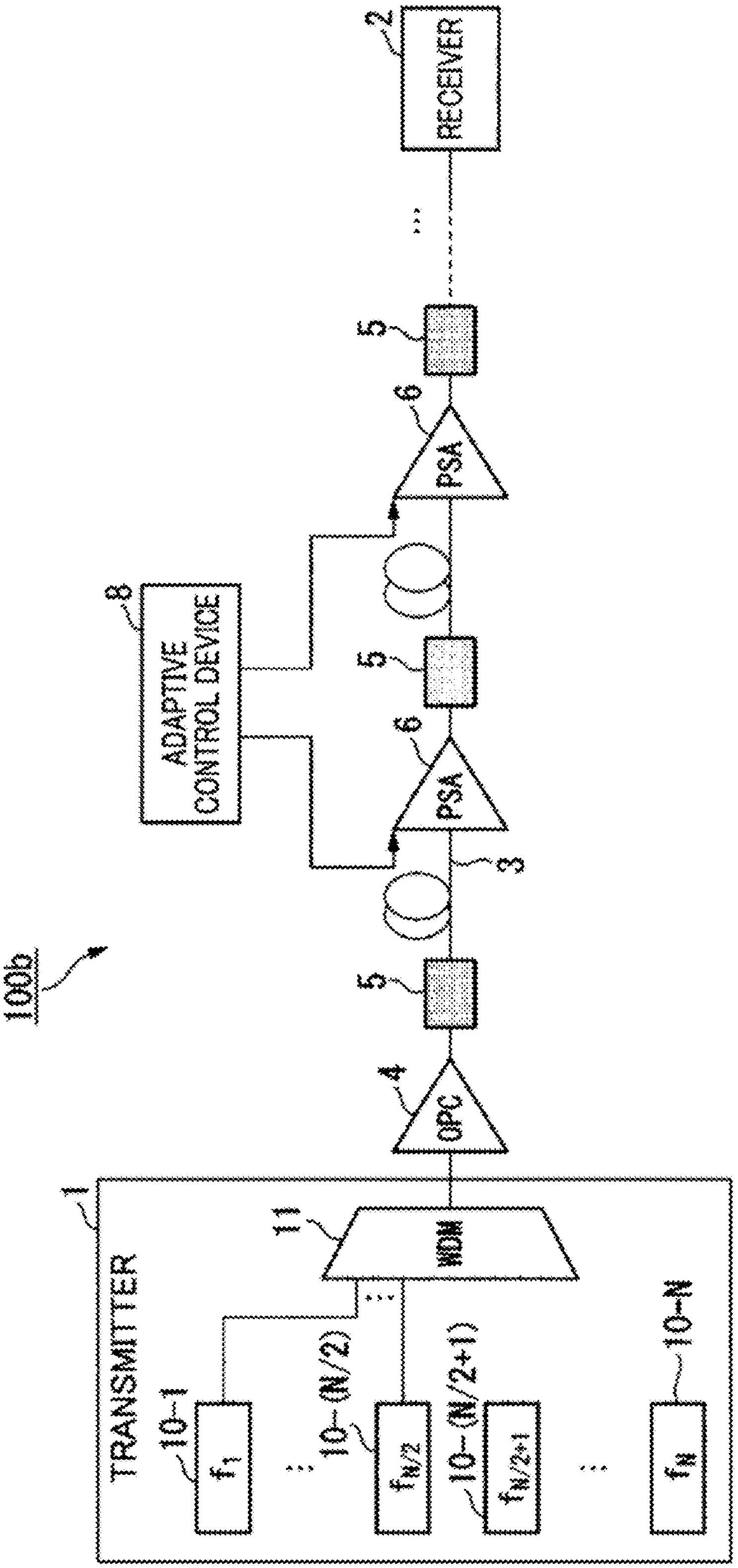
FIG. 11 is a diagram showing an example of a configuration of a transmission system 100*b* according to the modified example.

FIG. 11 is a diagram showing an example of a configuration of the transmission system 100*b* according to a modified example. The transmission system 100*b* includes a transmitter 1, a receiver 2, a transmission line 3, an OPC 4, one or more optical power adjustment parts 5, and one or more PSAs 6 and further includes an adaptive control device 8. That is to say, the transmission system 100*b* is different from the transmission system 100 in that the adaptive control device 8 is provided.

The adaptive control device & performs adaptive control of the relative phases among the signal light, the idler light and the excitation light (hereinafter referred to as "phase adaptive control"). That is to say, the adaptive control device 8 controls the relative phases among the signal light, the idler light, and the excitation light to be controlled to have an appropriate phase relationship.

Specifically, phase adaptive control is performed on the basis of the result of tapping and monitoring a part of the output of the PSA 6. More specifically, phase adaptive control is a process of performing phase control to maximize the monitored value on the basis of the results of tapping and monitoring a portion of the output of the PSA 5. The monitor value is the light intensity of a part of the output of the PSA 6 which is monitored after being tapped. The reason that phase control is performed to maximize the monitor value is that the output of the PSA 6 is greatest when the appropriate phase relationship is satisfied. Phase adaptive control is performed using the adaptive control device 8. An example of the configuration of the adaptive control device 8 will be described later.

Figure 12:
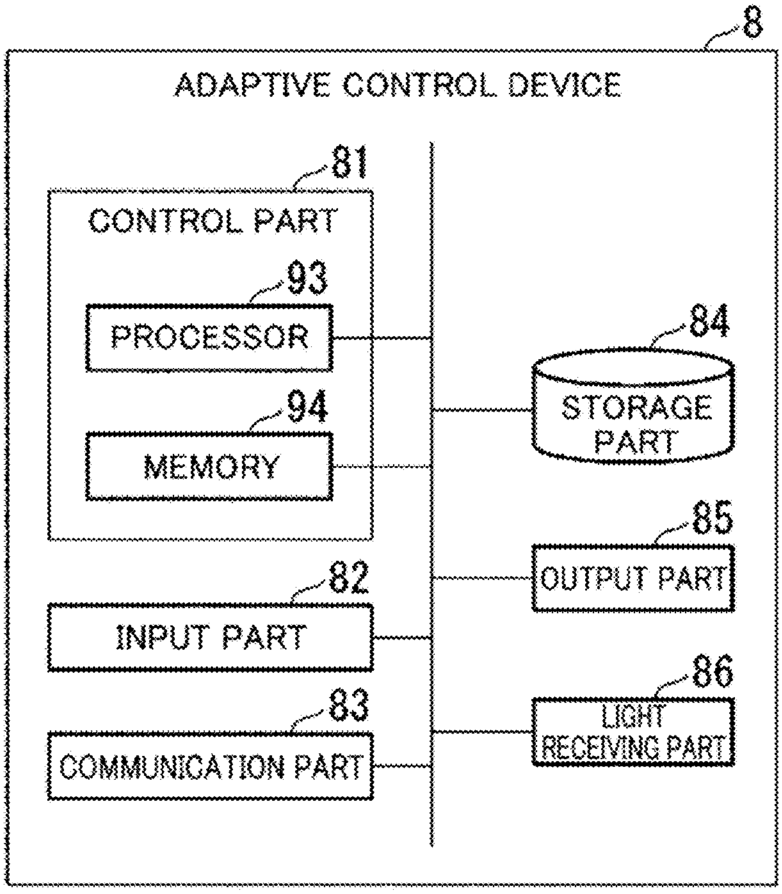
FIG. 12 is a drawing showing an example of a hardware configuration of an adaptive control device 8 according to the embodiment.

FIG. 12 is a diagram showing an example of a hardware configuration of an adaptive control device 8 according to an embodiment. The adaptive control device 8 includes a control part 81 including a processor 93 such as a central processing unit (CPU) and a memory 94 connected via a bus and executes a program. The adaptive control device 8 functions as a device including a control part 81, an input part 82, a communication part 83, a storage part 34, an output part 85, and a light receiving part 86 by executing a program.

More specifically, a processor 91 reads a program stored in a storage part 84 and causes a memory 92 to store the read program. The adaptive control device 8 is configured as a device including the control part 81, the input part 82, the communication part 83, the storage part 84, the output part 85, and the light receiving part 86 by executing the program stored in the memory 92 by the processor 91.

The control part 81 controls operations of various functional parts included in the adaptive control device 8 such as the input part 82, the communication part 83, the storage part 84, the output part 85, and the light receiving part 86. The control part 81, for example, records various information in the storage part 84. The control part 81, for example, performs phase adaptive control. The control part 81 adaptively controls the relative phases among the signal light, the idler light, and the excitation light, for example, by controlling the operation of the phase adjustment part 64 via the communication part 83. In such a case, the phase adjustment part 64 is controlled by the control part 81 to control the relative phases among the signal light, idler light, and excitation light.

The input part 82 includes input devices such as a mouse, a keyboard, and a touch panel. The input part 82 may be configured as an interface connecting these input devices to the adaptive control device 8. The input part 82 receives an input of various information to the adaptive control device 8.

The communication part 83 includes a communication interface through which the adaptive control device 8 is connected to an external device. The communication part 83 communicates with an external device in a wired or wireless manner. The external device is, for example, the phase adjustment part 64.

The storage part 84 is configured using a computer-readable storage medium device such as a magnetic hard disk device or a semiconductor storage device. The storage part 84 stores various information concerning the adaptive control device 8. The storage part 84, for example, stores information input via the input part 82 or the communication part 33.

The output part 85 outputs various information. The output part 85 includes a display device such as a CRT display, a liquid crystal display, an organic EL display, or the like. The output part 85 may be configured as an interface through which these display devices are connected to the adaptive control device 8. The output part 85, for example, outputs information input to the input part 82.

The light receiving part 86 receives the OPC light and the excitation light generated by the excitation light generation part 62. Hereinafter, the excitation light generated by the excitation light generation part 62 will be referred to as PSA excitation light. The light receiving part 86 receives a part of the OPC light tapped using an optical coupler which distributes the power of the input light to two optical fibers at a predetermined ratio, for example, using a half mirror installed on the optical path in the PSA 6 in which the OPC light propagates, a structure in which two optical fibers are fused, and a dielectric multilayer film. The light receiving part 86, for example, receives a part of the PSA excitation light tapped using the half mirror or the optical coupler installed on the optical path in the PSA 6 in which the PSA excitation light propagates. The light receiving part 86 outputs a signal indicating the result of light reception to the control part 81. The result of light reception is specifically the monitor value described above. The control part 81 performs phase control on the basis of the result of light reception by the light receiving part 86 so that the monitor value is maximized.

In this way, the adaptive control device 8 controls the relative phases among the signal light, the idler light, and the excitation light to be controlled to have an appropriate phase relationship.

Note that the transmission system 100*b* may include the signal generation control device 7.

Note that each of the signal generation control device 7 and the adaptive control device 8 may be implemented using a plurality of information processing devices which are communicably connected over a network. In this case, each functional part included in each of the signal generation control device 7 and the adaptive control device 8 may be distributed and implemented in a plurality of information processing devices.

Note that the signal generation control device 7 and the adaptive control device 8 do not necessarily need to be implemented as different devices. The signal generation control device 7 and the adaptive control device 8 may be implemented, for example, as one device having both functions.

Note that all or a part of each function of the signal generation control device 7 and the adaptive control device 8 may be realized using hardware such as application specific integrated circuits (ASICs), programmable logic devices (PLDs), and field programmable gate arrays (FPGAS). The program may be recorded on a computer-readable recording medium. The computer-readable recording media include portable media such as flexible disks, magneto-optical disks, ROMS and CD-ROMs, and storage devices such as hard disks incorporated in computer systems. The program may be transmitted over telecommunications lines.

Although the embodiment of the present invention has been described in detail with reference to the drawings, the specific configuration is not limited to this embodiment and design and the like within the scope of the gist of the present invention are included.

REFERENCE SIGNS LIST

100 Transmission system
1 Transmitter
2 Receiver
3 Transmission line
4 OPC
5 Optical power adjustment part
6 PSA
10-1 to 10-N Signal source
11 WDM
41 Polarization demultiplexing part
42 Excitation light multiplexing part
43 Optical amplifying part
44 Excitation light demultiplexing part
45 Polarization multiplexing part
51 Band demultiplexer
52 First band optical amplifier
53 Second band optical amplifier
54 First gain equalization filter
55 Second gain equalization filter
56 Band multiplexer
61 Synchronization light separation part
62 Excitation light generation part
63 Polarization demultiplexing part
64 Phase adjustment part 65 Excitation light multiplexing part
66 Optical amplifying part
67 Excitation light demultiplexing part
68 Polarization multiplexing part
7 Signal generation control device
71 Control part
72 Input part
73 Communication part
74 Storage part
75 Output part
8 Adaptive control device
81 Control part
82 Input part
83 Communication part
84 Storage part
85 Output part
86 Light receiving part
91 Processor
92 Memory
93 Processor
Memory

The invention claimed is:

1. A transmission system which transmits an optical signal, comprising:

a phase conjugate light generator which generates phase conjugate light of the optical signal, where the optical signal has a frequency in a first band, the phase conjugate light has a frequency in a second band that differs from the first band; and an optical phase-sensitive amplifier which phase-sensitively amplifies the optical signal and the phase conjugate light, wherein the first band is a frequency band in which the sensitivity of light reception of a receiver which receives the optical signal is a predetermined level or more among the frequency bands in which a transmitter which outputs the optical signal is able to output the optical signal with a predetermined intensity or more and the second band is a higher or lower frequency band than the first band;

wherein the phase conjugate light generator generates the phase conjugate light of the input optical signal through an optical parametric amplification process using a non-linear optical medium having an amplification band center between the first band and the second band;

wherein the optical phase sensitive amplifier performs phase sensitive amplification through interaction among three light waves of the input optical signal, the phase conjugate light, and the excitation light through an optical parametric amplification process using a non-linear optical medium having an amplification band center between the first band and the second band.

2. The transmission system according to claim 1, further comprising:

an optical power adjuster which adjusts the power of the optical signal and the phase conjugate light.

3. The transmission system according to claim 2, wherein the optical power adjuster reduces a difference in power between the optical signal and the phase conjugate light caused by a difference in transmission loss caused due to a difference in transmission band between the optical signal and the phase conjugate light.

4. The transmission system according to claim 1, further comprising:

a signal source which generates the optical signal; and a control part which controls an operation of the signal source.

5. A transmission method performed by a transmission system which includes a phase conjugate light generator which generates phase conjugate light of an optical signal and an optical phase-sensitive amplifier which phase-sensitively amplifies the optical signal and the phase conjugate light, where the optical signal has a frequency in a first band, and the phase conjugate light has a frequency in a second band that differs from the first band and in which the first band is a frequency band in which the sensitivity of light reception of a receiver which receives the optical signal is a predetermined level or more among the frequency bands in which a transmitter which outputs the optical signal is able to output the optical signal with a predetermined intensity or more and the second band is a higher or lower frequency band than the first band, comprising:

generating the optical signal;

generating a phase conjugate light of the optical signal through an optical parametric amplification process using a non-linear optical medium having an amplification band center between the first band and the second band; and performing phase sensitive amplification through interaction among three light waves of the optical signal, the phase conjugate light, and the excitation light through an optical parametric amplification process using a non-linear optical medium having an amplification band center between the first band and the second band.

6. A non-transitory computer readable medium which stores a program for causing a computer to function as a phase conjugate light generator which generates phase conjugate light of the optical signal, where the optical signal has a frequency in a first band, the phase conjugate light has a frequency in a second band that differs from the first band;

an optical phase-sensitive amplifier which phase-sensitively amplifies the optical signal and the phase conjugate light, wherein the first band is a frequency band in which the sensitivity of light reception of a receiver which receives the optical signal is a predetermined level or more among the frequency bands in which a transmitter which outputs the optical signal is able to output the optical signal with a predetermined intensity or more and the second band is a higher or lower frequency band than the first band;

wherein the phase conjugate light generator generates the phase conjugate light of the input optical signal through an optical parametric amplification process using a non-linear optical medium having an amplification band center between the first band and the second band;

wherein the optical phase sensitive amplifier performs phase sensitive amplification through interaction among three light waves of the input optical signal, the phase conjugate light, and the excitation light through an optical parametric amplification process using a non-linear optical medium having an amplification band center between the first band and the second band;

a signal source which generates the optical signal; and a control part which controls an operation of the signal source.

* * * * *